United States Patent
Kumar et al.

(10) Patent No.: US 9,128,514 B2
(45) Date of Patent: Sep. 8, 2015

(54) AUTOMATIC ACCOUNT DETECTION AND ASSOCIATION

(75) Inventors: Ashok Kumar, Flower Mound, TX (US); Leena Naidu, Irving, TX (US); Javier Martinez, Coppell, TX (US); Ashok Kandaswamy, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 178 days.

(21) Appl. No.: 13/534,871

(22) Filed: Jun. 27, 2012

(65) Prior Publication Data

US 2014/0006960 A1  Jan. 2, 2014

(51) Int. Cl.
*G06F 3/0482* (2013.01)
*G06F 3/01* (2006.01)
*H04L 29/08* (2006.01)
*H04W 4/00* (2009.01)

(52) U.S. Cl.
CPC ...... *G06F 3/01* (2013.01); *H04L 67/30* (2013.01); *H04W 4/001* (2013.01)

(58) Field of Classification Search
CPC ........... H04W 4/08; H04W 4/24; H04W 8/02; H04W 8/18; H04W 4/003; H04W 48/18
USPC ........................................................ 715/739
See application file for complete search history.

(56) References Cited

U.S. PATENT DOCUMENTS

| | | | |
|---|---|---|---|
| 7,895,645 B2 * | 2/2011 | Bodepudi et al. ................. 726/5 |
| 2005/0216300 A1 * | 9/2005 | Appelman et al. ............... 705/1 |
| 2006/0239206 A1 * | 10/2006 | Rao et al. ...................... 370/254 |
| 2006/0288406 A1 * | 12/2006 | Kuhn et al. ........................ 726/8 |
| 2007/0060310 A1 * | 3/2007 | Juds et al. ........................ 463/25 |
| 2007/0097860 A1 * | 5/2007 | Rys et al. ....................... 370/229 |
| 2008/0172372 A1 * | 7/2008 | Shacham et al. .................. 707/5 |
| 2008/0201461 A1 * | 8/2008 | Yoshiuchi ....................... 709/223 |
| 2009/0106127 A1 * | 4/2009 | Purdy et al. ..................... 705/27 |
| 2009/0222899 A1 * | 9/2009 | Walters ............................. 726/8 |
| 2009/0298535 A1 * | 12/2009 | Klein et al. ................ 455/556.1 |
| 2010/0082777 A1 * | 4/2010 | Montgomery et al. ........ 709/220 |
| 2010/0125652 A1 * | 5/2010 | Rantapuska et al. ........... 709/222 |
| 2010/0203963 A1 * | 8/2010 | Allen et al. ...................... 463/30 |
| 2010/0274692 A1 * | 10/2010 | Hammad ........................ 705/30 |
| 2010/0291912 A1 * | 11/2010 | Tafarrodi et al. ............. 455/419 |
| 2011/0087530 A1 * | 4/2011 | Fordyce et al. ............ 705/14.17 |
| 2012/0317261 A1 * | 12/2012 | Ahmavaara ................... 709/223 |
| 2013/0298215 A1 * | 11/2013 | Kuznetsov et al. ............... 726/8 |
| 2014/0248852 A1 * | 9/2014 | Raleigh et al. ................ 455/407 |

* cited by examiner

*Primary Examiner* — Namitha Pillai

(57) ABSTRACT

A system is configured to receive a selection of an accounts application from a user device associated with a first account. The system is further configured to determine a network identifier, associated with the user device, based on receiving the selection of the accounts application; determine whether the network identifier, associated with the user device, is associated with a second account; generate an association among the first account, the second account, and the user device, based on determining that the network identifier, associated with the user device, is associated with the second account; and cause the user device to present information regarding accounts associated with the user device, in a single interface on the user device. The system is further configured to receive a selection of one of the accounts associated with the user device and cause the user device to display information for the selected one of the accounts.

20 Claims, 7 Drawing Sheets

| Network Identifiers | | | User Device Identifiers | | |
|---|---|---|---|---|---|
| WAN ID | WAN IP | Login credentials (User name) | MAC Address | IMEI | ICCID |
| 4828CWF4 | 123.345.56.78 | jamesd123 | 00:12:34:56b:7c | 12345678901 2345 | 123456789012 3456789 |
| 4828CWF5 | 123.345.56.79 | bobv372 | 00:12:34:56b:7f | 12345678901 2346 | 123456789012 3456780 |
| 4828CWF6 | 123.345.56.80 | michaels492 | 00:12:34:56b:7d | 12345678901 2347 | 123456789012 3456781 |
| 4828CWF7 | 123.345.56.81 | | 00:12:34:56b:7e | 12345678901 2348 | 123456789012 3456782 |
| | | | Unassociated | | |

Fig. 4

AUTOMATIC ACCOUNT DETECTION AND ASSOCIATION

BACKGROUND

Users sometimes subscribe to service providers to receive various services, such as telephone services, television services, and/or some other type of service. Users may hold accounts with different service providers and may use user devices to access information associated with the accounts. Users may be associated with multiple service accounts associated with multiple service providers.

BRIEF DESCRIPTION OF THE DRAWINGS

FIG. 4 illustrates an example data structure that may be stored by one or more servers of FIG. 2;

DETAILED DESCRIPTION OF THE PREFERRED EMBODIMENTS

The following detailed description refers to the accompanying drawings. The same reference numbers in different drawings may identify the same or similar elements.

The systems and/or methods, as described herein, may generate an association between an account and a user device based on determining that the user device is associated with a network identifier associated with the account. The account may describe an account between a user and a service provider for a specific service (e.g., for home services, mobile services, and/or some other type of service). For example, a "home account" may describe an account between a user and a home service provider (e.g., a provider of home telephone, television, home automation, and/or some other service). Additionally, or alternatively, a "mobile account" may describe an account between a user and a mobile service provider (e.g., a provider of mobile telephone and/or other data services). In one implementation, the network identifier may include a wide area network (WAN) identifier (ID) (e.g., a modem identifier, a wireless router identifier), a WAN internet protocol (IP) address, an access point name, and/or some other identifier. The identifier(s) may be received by and/or assigned to the user device based on the user device connecting to a network (e.g., via a network device, such as a router device, an access point, a cable modem, or the like). While the network identifiers may be described in terms of WAN IDs and WAN IPs, in practice, the network identifiers may include any identifier associated with a home network.

In one implementation, a WAN ID may identify a network device that may be associated with a home account (e.g., a router device that is owned and/or operated by a service provider associated with the home account). Additionally, a WAN IP address may identify an IP address associated with the home account (e.g., an IP address provided by a service provider associated with the home account).

In some implementations, the user device may present information for an account based on the user device receiving a network identifier associated with the account. For example, the user device may present information associated with a home account based on the user device receiving a network identifier associated with the home account (e.g., when the user device connects with a network device associated with the home account).

Figure 1:
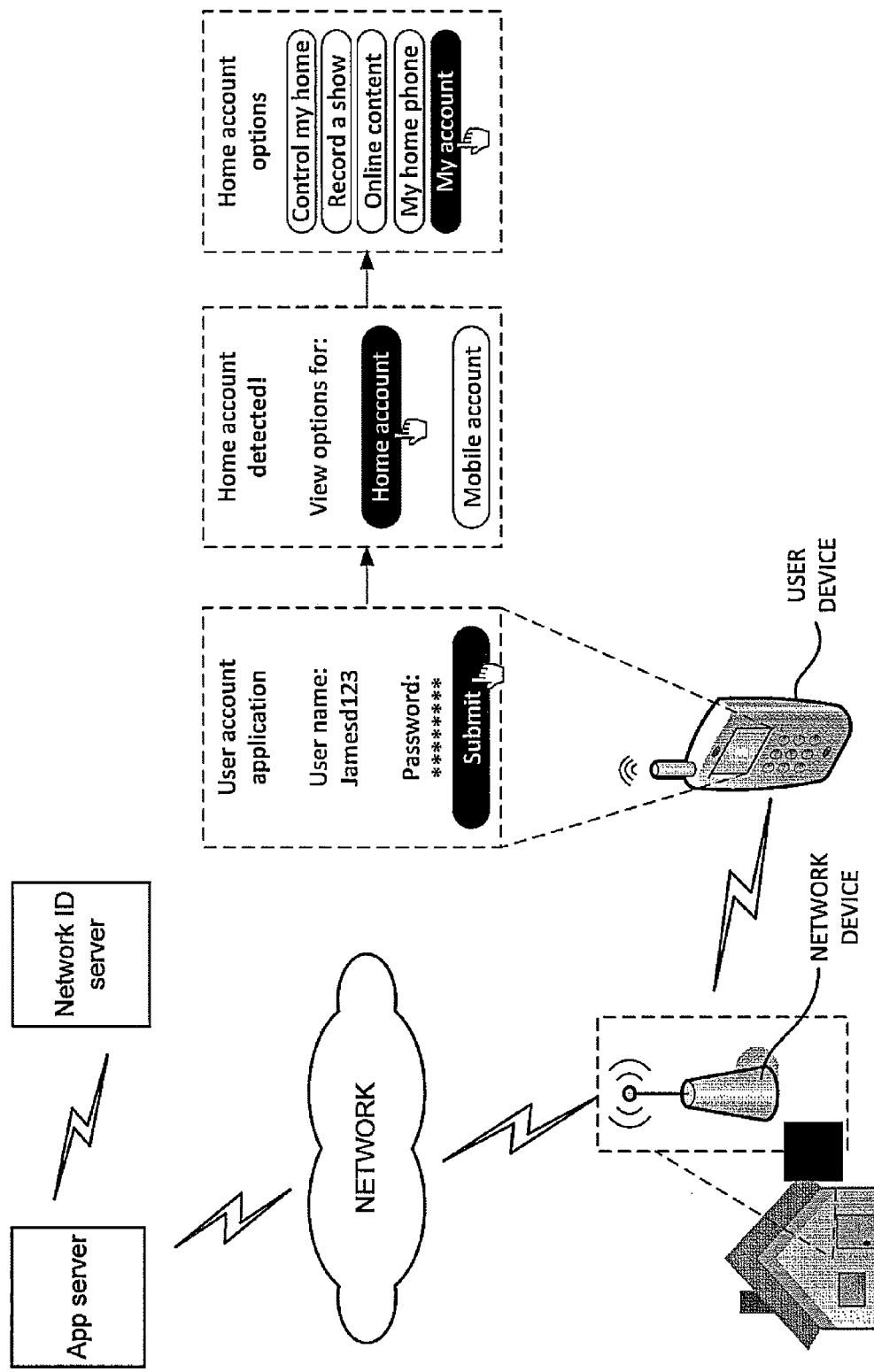
FIG. 1 illustrates an example overview implementation as described herein.

FIG. 1 illustrates an example overview implementation, as described herein. In FIG. 1, assume that a user, associated with a user device, is associated with a home account and with a mobile account. Further, assume that the user may use the user device to access the home account via a first set of login credentials, and that the user may access the mobile account via a second set of login credentials.

As shown in FIG. 1, assume that a user device connects to a network via a network device located in a residential home (and/or some other geographic location). Further assume that the network device includes an identifier associated with a home account and that the user device receives the identifier based on connecting with the network device. In some implementations, a user, associated with the user device, may select an account application associated with the user device. In some implementation, the account application may include a graphical user interface (GUI) to allow a user, associated with the user device, to access information regarding one or more accounts (e.g., a mobile account). In FIG. 1, assume that the user uses the account application to access a mobile account. Based on the user device receiving the selection of the account application (e.g., by receiving the selection from the user and/or by receiving login credentials associated with the mobile account), an application server (referred to as an "app server") may generate an association between a home account (or some other account) and the user device. Additionally, or alternatively, the app server may generate an association between the login credentials and the home account, thereby linking the login credentials for the mobile account with the home account.

For example, the app server may determine a network identifier associated with the user device when the user device connects to a network (e.g., a WAN IP address, a WAN ID, and/or some other identifier) via the network device. Additionally, the app server may communicate with a network ID server to determine that the network identifier associated with the user device corresponds to a network identifier associated with a home account. Additionally, or alternatively, the app server may generate an association between the user device and the home account based on determining that the network identifier associated with the user device corresponds to the network identifier associated with a home account. As a result, the app server may generate an association between the user device and/or the login credentials for the mobile account with the home account. Further, the user may access both the home account and/or the mobile account via either the login credentials associated with the home account or via the login credentials associated with the mobile account, based on the app server generating the association among the user the device, the home account, and the mobile account.

In some implementations, the user device may present options to allow a user, associated with the user device, to select an account associated with the user device. For example, as shown in FIG. 1, the user device may present a list of accounts associated with the user device (e.g., a home account, a mobile account and/or some other account). In the example of FIG. 1, the list of accounts may include the home account, since an association was generated between the home account and the user device, as described above. Further, the user may select an account to perform functions and/or receive information associated with the account.

As further shown in FIG. 1, assume that the user has selected to perform functions and/or receive information associated with the home account. The user device may allow the user to perform functions and/or receive information associated with the home account (e.g., "control my home," "record a show," "online content," "my home phone," "my account," etc.). In another example, the user device may allow the user to perform functions and/or receive information associated with some other account (e.g., a mobile account).

In some implementations, the systems and/or methods may streamline the user experience by presenting the user, via the user device, with information regarding accounts with which the user may be associated. For example, the user device may present information regarding the home account when the user device connects to a network device associated with the home account. Additionally, or alternatively, the user may access multiple accounts associated with the user via a single set of login credentials, as described above.

While systems and/or methods may be described in terms of generating an association between a home account and a mobile account based on an existing association between the mobile account and a user device, in practice, the systems and/or methods are not so limited. For example, the systems and/or methods may be used to generate an association between a mobile account and a home account based on an existing association between the home account and a user device.

Figure 2:
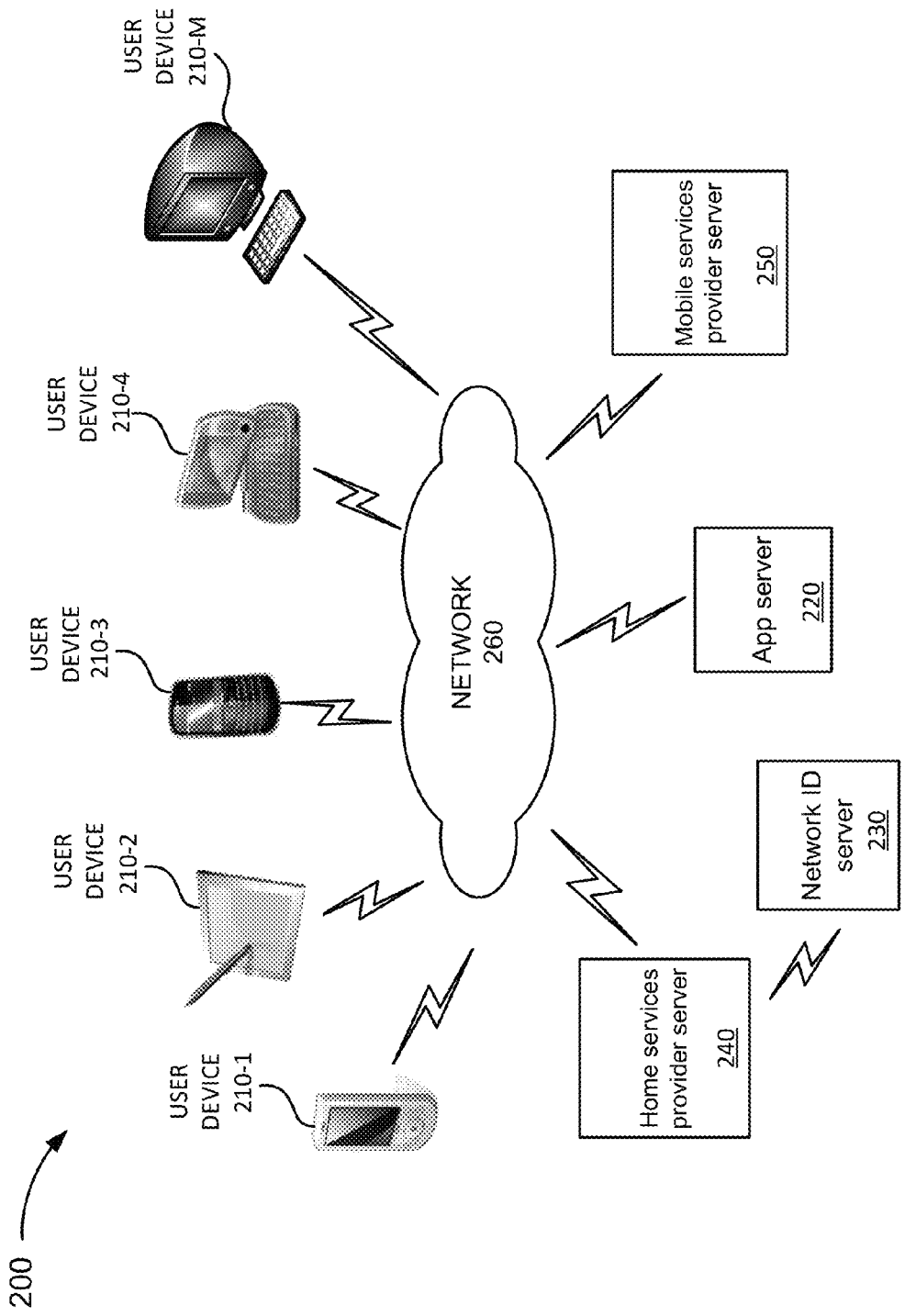
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user devices 210-1, 210-2, . . . , 210-M (where M≥1) (collectively referred to as "user devices 210," and individually as "user device 210"), app server 220, network ID server 230, home services provider server 240, mobile services provider server 250, and/or network 260. While FIG. 2 shows a particular quantity and arrangement of devices, in practice, environment 200 may include additional devices, fewer devices, different devices, or differently arranged devices than are shown in FIG. 2. For example, each of servers 220-250 may be implemented as multiple, possibly distributed, devices. Alternatively, two or more of servers 220-250 may be implemented within a single device. Further, a function described as being performed by one server may be performed by another server. Additionally, or alternatively, a function described as being performed by a user device may be performed by a server, or vice versa.

User device 210 may include any portable or non-portable device capable of communicating via a network. For example, user device 210 may correspond to a mobile communication device (e.g., a mobile phone or a personal digital assistant (PDA)), a portable computer device (e.g., a laptop or a tablet computer), or another type of portable device. User device 210 may also, or alternatively, include a client device, such as a set top box for a television, a digital video recorder (DVR), a desktop computer, or the like. In some implementations, user device 210 may be associated with a network identifier when user device 210 connects to network 260. For example, user device 210 may be assigned a WAN IP address, and/or may be associated with a WAN ID corresponding to a network device connected to user device 210.

App server 220 may include a computing device, such as a server device or a collection of server devices. In one implementation, app server 220 may process instructions received from user device 210 to present account information for one or more accounts associated with user device 210. Additionally, or alternatively, app server 220 may process some other instruction received from user device 210. In some implementations, app server 220 may determine a network identifier (e.g., a WAN IP address WAN ID, and/or some other identifier) associated with user device 210 when user device 210 connects to network 260. Additionally, app server 220 may communicate with network ID server 230 to determine whether the network identifier, associated with user device 210, corresponds to a network identifier associated with an account stored by network ID server 230.

Network ID server 230 may include a computing device, such as a server device or a collection of server devices. In one implementation, network ID server 230 may store identifiers, such as WAN IDs, WAN IPs, and/or some other identifiers associated with an account (e.g., a home account). In one implementation, a WAN ID may identify a network device that may be associated with a home account (e.g., a device that is owned and/or operated by a service provider associated with the home account). Additionally, a WAN IP address may identify an IP address associated with the home account (e.g., an IP address provided by a service provider associated with the home account). In some implementations, network ID server 230 may receive network identifiers from home services provider server 240.

Home services provider server 240 may include a computing device, such as a server device or a collection of server devices, associated with a home services provider. In one implementation, home services provider server 240 may store information for subscribers of home services (e.g., contact information, billing information, subscription services, etc.). Additionally, or alternatively, home services provider server 240 may store information for devices owned and/or operated by the home service provider (e.g., network equipment, routers, and/or some other devices). For example, home services provider server 240 may store information for network devices, such as WAN IDs associated with network devices. Additionally, or alternatively, home services provider server 240 may store information for WAN IP addresses provided to subscribers of home services (e.g., internet services). In some other implementation, home services provider server 240 may provide information to app server 220, in response to app server 220 receiving a selection of a home account from user device 210. For example, home services provider 240 may provide billing information and/or some other information to app server 220 based on receiving a selection for information from a user interface of user device 210.

Mobile services provider server 250 may include a computing device, such as a server device or a collection of server devices, associated with a mobile services provider. In one implementation, mobile services provider server 250 may store information for subscribers of mobile services (e.g., contact information, billing information, data usage, telephone minutes usage, subscription services, etc.). Mobile services provider server 250 may provide information to app server 220, in response to app server 220 receiving a selection of a mobile account from user device 210. For example, mobile services provider 250 may provide data usage information to app server 220 based on receiving a selection for data usage information from a user interface of user device 210.

Network 260 may include any type of network or a combination of networks. For example, network 260 may include a LAN, a mobile LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic (e.g., a FiOS) network, a direct connection between devices, or a combination of networks. Each of user device 210, app server 220, network ID server 230, home services provider server 240 and/or mobile services provider server 250 may connect to network 260 via a wireless connection, a wired connection, or a combination thereof.

Figure 3:
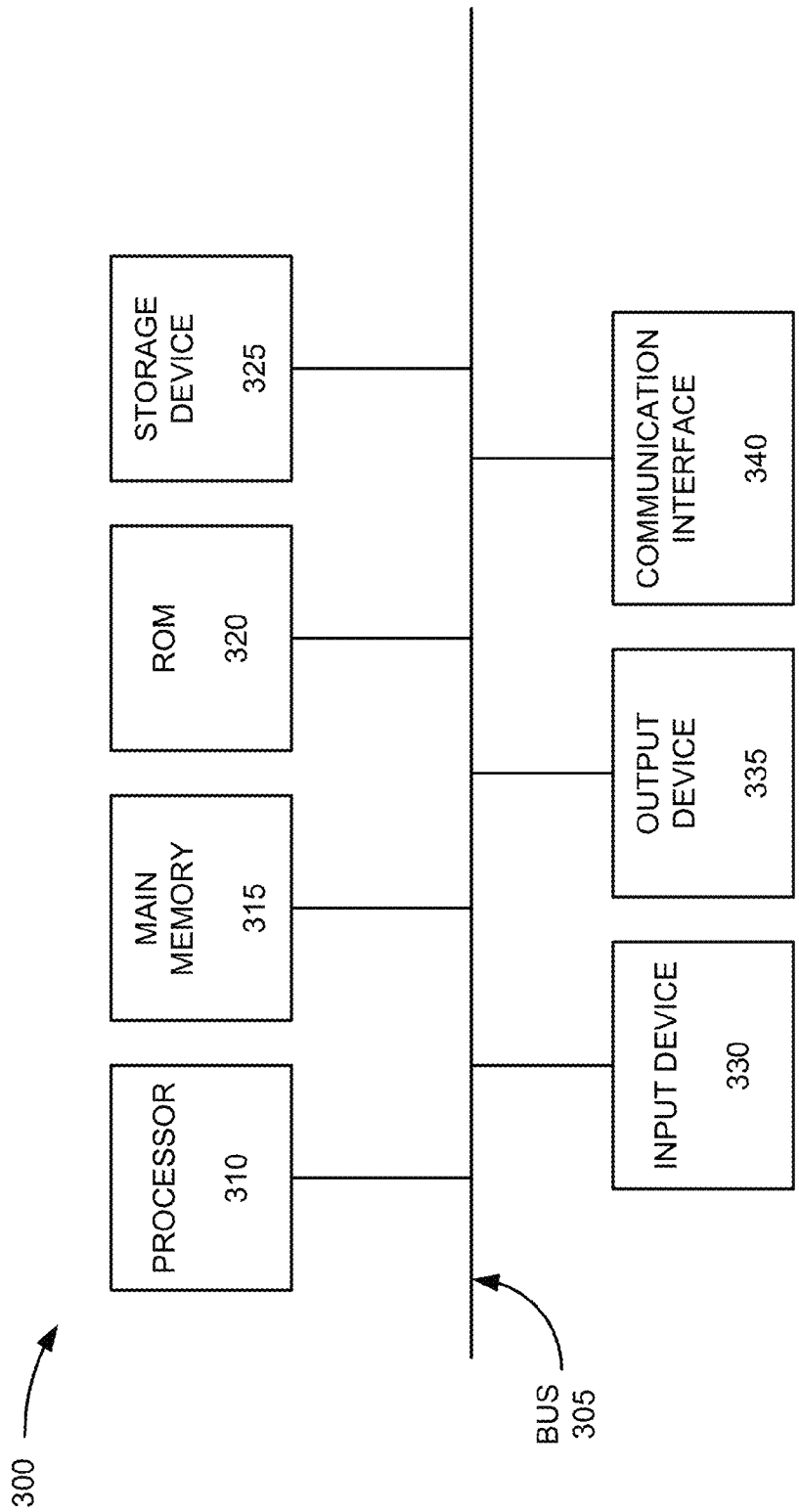
FIG. 3 illustrates example components of a device that may be used within the environment of FIG. 2.

FIG. 3 illustrates example components of a device 300 that may be used within environment 200 of FIG. 2. Device 300 may correspond to user device 210 and/or servers 220-250. Each of user device 210 and/or servers 220-250 may include one or more devices 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

FIG. 4 illustrates an example data structure 400 that may be stored by one or more servers, such as app server 220. In one implementation, data structure 400 may be stored in a memory of app server 220. In another implementation, data structure 400 may be stored in a memory separate from, but accessible by, app server 220. App server 220 may store multiple data structures 400 associated with information that identifies user devices 210 associated with accounts. For example, one instance of data structure 400 may include information identifying user devices 210 for a specific account type (e.g., home accounts), whereas another instance of data structure 400 may include information identifying user devices 210 for some other account type (e.g., mobile accounts, etc.). A particular instance of data structure 400 may contain different information and/or fields than another instance of data structure 400. In an example shown in FIG. 4, assume that data structure 400 is associated with the home account.

As shown in FIG. 4, data structure 400 may include network identifiers field 410 and/or user device identifiers field 420. In some implementations, data structure 400 may include additional fields, fewer fields, different fields, or differently arranged fields than are shown in FIG. 4.

Network identifiers field 410 may include information for network parameters associated with an account (e.g., a home account). For example, network identifiers field 410 may store information for a WAN ID associated with a network device associated with a home account (e.g., a network device owned and/or operated by a service provider associated with the home account). Additionally, or alternatively, network identifiers field 410 may store information for a WAN IP associated with a home account (e.g., an IP address provided by a service provider associated with the home account).

As described above, user device 210 may receive network identifiers when user device 210 connects to network 260. In some implementations, network identifiers field 410 may store information based on app server 220 generating an association between user device 210 and a home account (e.g., by communicating with network ID server 230 to determine that a network identifier associated with user device 210 is associated with the home account). Additionally, or alternatively, network identifiers field 410 may include any or all of the network identifiers stored by network ID server 230.

User device identifiers field 420 may include information for user devices 210 associated with an account associated with data structure 400 (i.e., the home account). For example, user device identifiers field 420 may include a login credentials field, a media access control (MAC) address field, an international mobile equipment identity (IMEI) field, and/or an integrated circuit card identifier (ICCID) field. In some implementations, user device identifiers field 420 may include additional fields, fewer fields, different fields, or differently arranged fields than are shown in FIG. 4. Additionally, or alternatively, user device identifiers field 420 may identify network devices that do not have a user device 210 associated with them. For example, as shown in FIG. 4, the network device associated with the WAN ID "4828CWF7" may be unassociated with any user device 210 in an example in which user device 210 has not connected to the network device with the WAN ID "4828CWF7."

In some implementations, user device identifiers field 420 may store information for user device 210 based on app server 220 generating an association between user device 210 and a home account (e.g., by communicating with network ID server 230 to determine that a network identifier associated with user device 210 is associated with the home account). For example, assume that app server 220 determines that the network identifier associated with user device 210 is associated with the home account. Based on this determination, user device identifiers field 420 may store information for user devices 210 associated with the account of data structure 400 (e.g., the home account). Further, app server 220 may receive data stored by field 420 to identify accounts associated with user device 210. For example, app server 220 may identify that the user device with the IMEI "123456789012345" is associated with the home account associated with user jamesd123.

Additionally, or alternatively, user device identifiers field 240 may store a user ID based on app server 220 generating an association between the user ID and the home account. For example, a user may use user device 210 to access a mobile account via login credentials including the user ID "jamesd123." As described above, app server 220 may generate an association between user device 210 and the home account. App server 220 may additionally generate an association between the user ID and the home account. User device identifiers field 240 may store the user ID based on app server 240 generating the association between the user ID and the home account.

While the example data structure 400 shown in FIG. 4 is shown to store information associating user devices 210 with a home account, some other data structure 400 may store information associating user devices 210 with a mobile account or with some other type of account.

Figure 5:
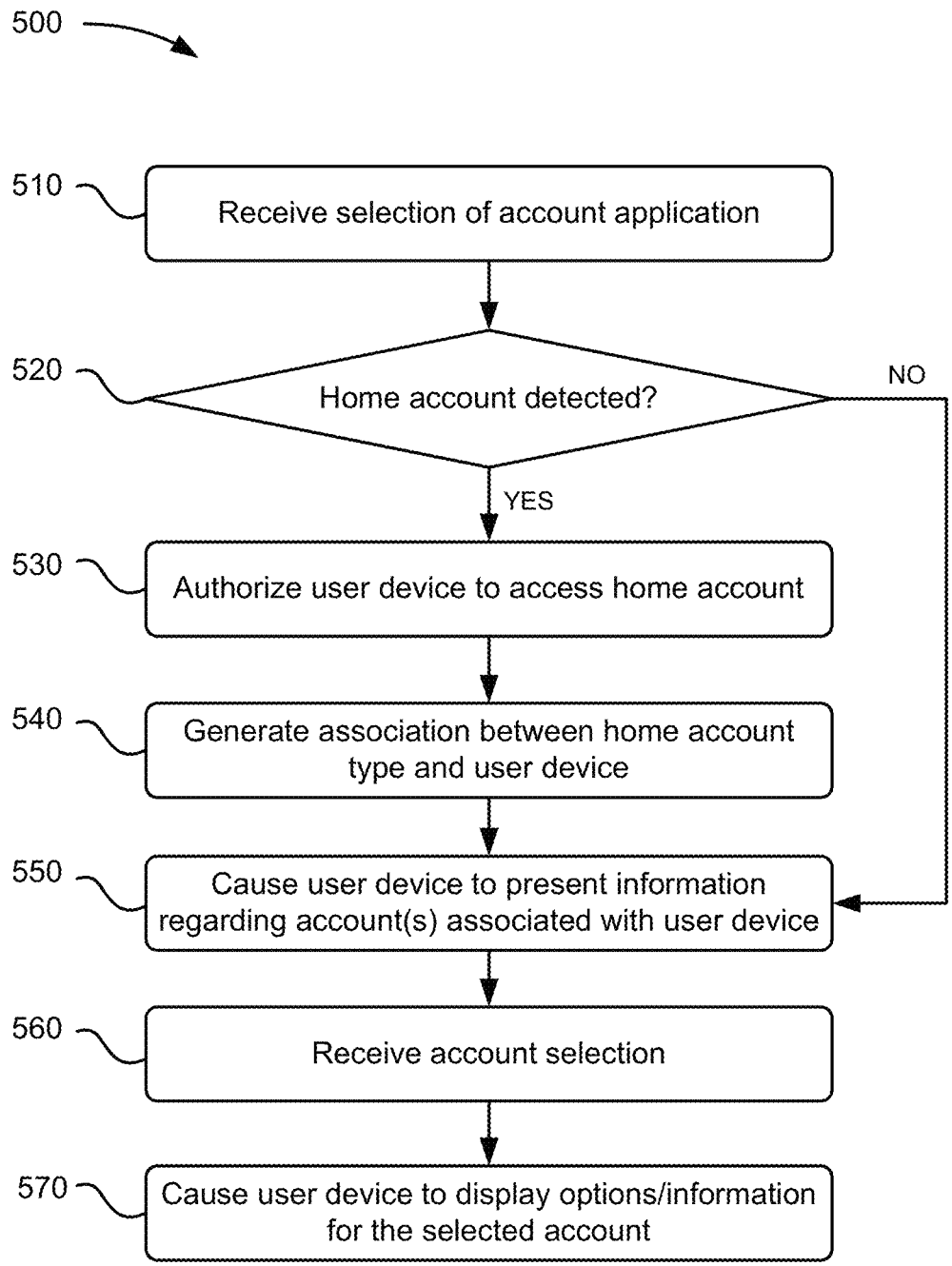
FIG. 5 illustrates a flowchart of an example process for identifying and/or presenting information regarding accounts associated with a user.

FIG. 5 illustrates a flowchart of an example process 500 for identifying and/or presenting accounts associated with a user. In one implementation, process 500 may be performed by one or more components of app server 220, such as processing unit 305 of app server 220. In another implementation, one or more blocks of process 500 may be performed by one or more components of another device (e.g., network ID server 230), or any group of devices including or excluding app server 220.

As shown in FIG. 5, process 500 may include receiving a selection of an account application (block 510). For example, app server 220 may receive a selection of an account application from user device 210. In some implementation, an account application may include a GUI to allow a user, associated with user device 210, to access information regarding one or more accounts (e.g., a mobile account, a home account, and/or some other type of account). In some implementations, app server 220 may receive a selection of the account application when the user provides user device 210 with login credentials associated with the one or more accounts. In FIG. 5, assume that app server 220 receives login credentials associated with a mobile account (e.g., to allow the user to access the mobile account). An example of app server 220 receiving a selection of the account application is described above with respect to FIG. 1.

Process 500 may further include detecting the home account (block 520). For example, as described above, app server 220 may determine a WAN IP address and/or some other identifier associated with user device 210. (e.g., an identifier of a network device via which user device 210 communicates with app server 220). Additionally, app server 220 may communicate with network ID server 230 to determine that the WAN IP address, and/or some other identifier, associated with user device 210, corresponds to a WAN IP address and/or some other identifier associated with the home account. As described above, user device 210 may associate with a WAN IP address based on connecting with network 260.

If, for example, app server 220 detects a home account, (block 520-YES), process 500 may include authorizing user device 210 to access the home account (block 530). For example, app server 220 may authorize user device 210 to access the home account based on querying user device 210 for authentication information (e.g., login credentials) associated with the home account. Additionally, or alternatively, app server 220 may authorize user device 210 using some other technique. In some implementations, block 530 may be omitted if user device 210 has been previously authorized to access the home account.

Process 500 may also include generating an association between the home account and user device 210 (block 540). For example, app server 220 may generate an association between user device 210 and the home account based on detecting the account, as described above. Additionally, or alternatively, app server 220 may store the generated association in data structure 400, as described above (e.g., app server 220 may store an IMEI, ICCID, and/or some other information associated with user device 210). Additionally, or alternatively, app server 220 may generate an association between the login credentials associated with the mobile account with the home account. Alternatively, block 540 may be omitted if an association between user device 210 and the home account already exists.

Process 500 may also include causing user device 210 to present information regarding account(s) (block 550). For example, app server 220 may cause user device 210 to present information regarding multiple accounts based on detecting multiple accounts associated with user device 210. In one implementation, app server 220 may cause user device 210 to present information regarding multiple accounts in a GUI of user device 210. In some other implementation, app server 220 may cause user device 210 to present only the home account based on detecting the home account, as described above.

Process 500 may further include receiving an account selection (block 560). For example, app server 220 may receive a selection of an account (e.g. a home account, a mobile account, or some other account) from user device 210, based on user device 210 receiving the selection from a user, associated with user device 210 (e.g., via a GUI). Alternatively, block 560 may be omitted in an implementation in which user device 210 is associated with only one account.

Process 500 may also include causing user device 210 to display options and/or information for the selected account (block 570). For example, app server 220 may cause user device 210 to display options and/or information for the selected account (e.g., the home account, the mobile account, and/or some other account). An example of selecting an account and presenting information and options associated with the selected account is described above with respect to FIG. 1.

If, on the other hand, app server 220 does not detect a home account (block 520-NO), process 500 may include causing user device 210 to present information regarding account(s) associated with user device 210 (block 550), receiving an account selection (block 560), and/or causing user device 210 to display options/information for the selected account (block 570), as described above.

Figure 6:
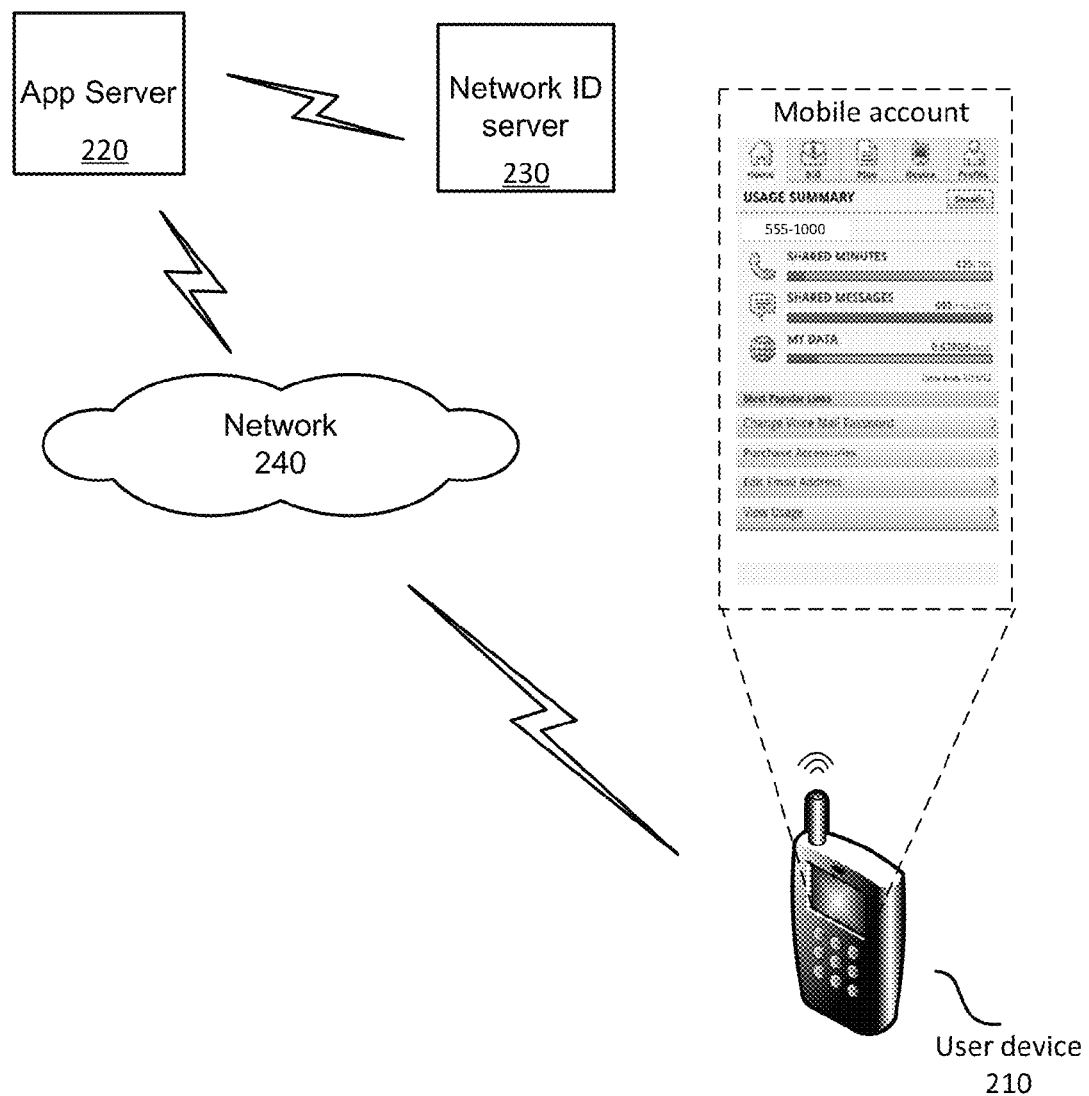
FIG. 6 is illustrates an example implementation described herein.

FIG. 6 illustrates an example implementation described herein. In FIG. 6, assume that user device 210 is associated with a mobile account. User device 210 may be associated with a WAN IP address and/or some other identifier based on connecting with network 260. As shown in FIG. 6, app server 220 may communicate with network ID server 230 to determine that the WAN IP associated with user device 210 is not associated with a home account, based on receiving a selection of an accounts application. App server 220 may cause user device 210 to display options/information associated with the mobile account since a home account (or some other account) was not detected and an association between user device 210 and the home account was not previously generated. In the example shown in FIG. 6, app server 220 may determine that user device 210 is associated only with a mobile account, thereby presenting only information regarding the account with which user device 210 is associated and streamlining the user's experience.

Figure 7:
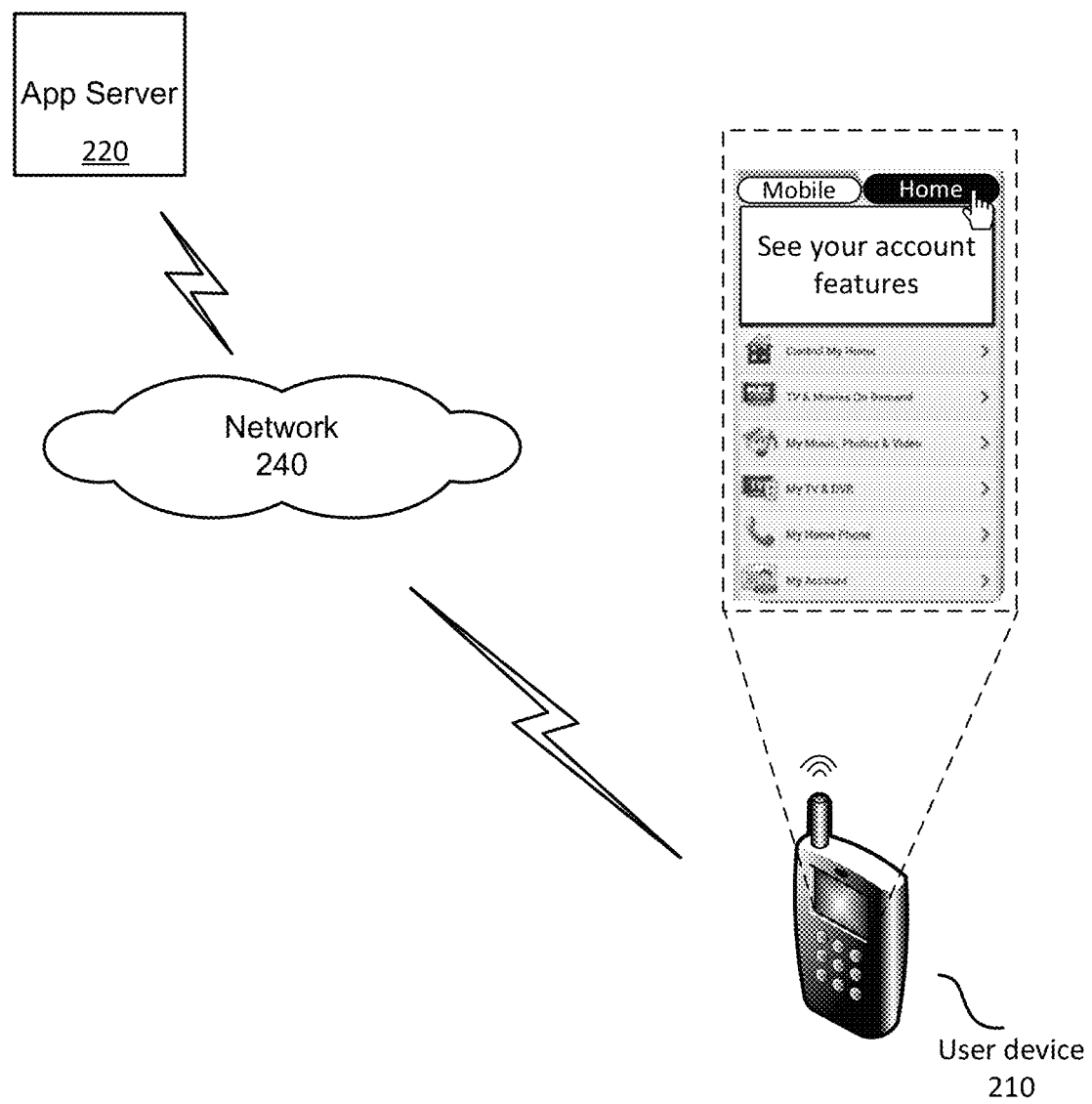
FIG. 7 is illustrates another example implementation described herein.

FIG. 7 illustrates an example implementation described herein. In FIG. 7, assume that user device 210 is associated with a mobile account and a home account (e.g., in a situation in which app server 220 had previously generated an association between user device 210 and the home account). As shown in FIG. 7, app server 220 may determine that user device 210 is associated with a home account and with a mobile account and cause user device 210 to display the option to select the home account or the mobile account even if user device 210 is not currently associated with a network identifier associated with the home account (e.g., in a situation where user device 210 is not connected to a network device associated with the home account). In some implementations, app server 220 may determine that user device 210 is associated with the home account based on user device 210 information stored in data structure 400 (e.g., app server 220 may identify that the IMEI of user device 210 is associated with a home account). As described above, app server 220 may store information associating user device 210 with the home account based on generating an association between user device 210 and the home account (e.g., when user device 210 connects with a network device associated with the home account). Additionally, or alternatively, app server 220 may present information regarding the home account and the mobile account based on receiving login credentials associated with the home account and/or the mobile account. For example, as described above, app server 220 may store information associating mobile account login credentials with a home account so that user device can access information regarding the home account by using the mobile account login credentials. Additionally, or alternatively, app server 220 may store information associating home account login credentials with a mobile account so that user device can access information regarding the mobile account by using the home account login credentials.

As described above, app server 220 may automatically detect one or more user accounts associated with user device 210, and generate an association between the one or more accounts. As a result, a user, associated with user device 210, may access information regarding the one or more accounts using a single set of login credentials, associated with one of the one or more accounts, and via a single GUI presented on user device 210.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 5, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

While particular user interfaces are presented with respect to FIGS. 6 and 7, user interfaces that contain additional information, different information, or differently arranged information could alternatively be used.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first server and via a network, a selection of an accounts application from a user device associated with a first account,
      the user device being configured to receive information for the first account via the accounts application, and
      the first account being associated with a mobile service provider;
   determining, by the first server, a network identifier, associated with a network device, based on receiving the selection of the accounts application,
      the user device connecting to the network via the network device;
   determining, by the first server, that the network device is associated with a second account based on the network identifier,
      the second account being associated with a home service provider;
   requesting, by the first server, login credentials associated with the second account based on determining that the network device is associated with the second account;
   receiving, by the first server, the login credentials associated with the second account from the user device;
   generating, by the first server, an association among the first account, the second account, and the user device based on receiving the login credentials associated with the second account;
   causing, by the first server and based on the association, the user device to present information regarding accounts associated with the user device, in a single user interface on the user device,
      the accounts including at least the first account and the second account;
   receiving, by the first server, a selection of one of the accounts associated with the user device; and
   causing, by the first server, the user device to display information for the selected one of the accounts.

2. The method of claim 1, further comprising:
   storing information associating the user device with the second account based on the association;

identifying the association between the user device and the second account based on the stored information; and causing the user device to present information regarding the second account based on identifying the association between the user device and the second account.

3. The method of claim 1,
where receiving the selection of the accounts application includes:
receiving login credentials associated with the first account, and where generating the association among the first account, the second account, and the user device includes:
generating an association among the first account, the user device, the second account, and the login credentials associated with the first account,
the association allowing:
the login credentials associated with the first account to be used to access the second account, and
the login credentials associated with the second account to be used to access the first account.

4. The method of claim 1,
where receiving the login credentials associated with the second account includes:
receiving a username and a password associated with the second account, and where generating the association among the first account, the second account, and the user device includes:
generating an association among the first account, the user device, the second account, and the user name and the password associated with the second account.

5. The method of claim 1, where the user device becomes associated with the network identifier by connecting to the network device to connect to the network.

6. The method of claim 1, where the network device is associated with the home service provider that is associated with the second account.

7. The method of claim 1, further comprising:
storing, based on the association, one or more of:
information associating login credentials associated with the first account with the second account, or
information associating the login credentials associated with the second account with the first account.

8. A system comprising:
one or more devices to:
receive, via a network, a selection of an accounts application from a user device associated with a first account,
the user device being configured to receive information for the first account via the accounts application, and
the first account being associated with a mobile service provider;
determine a network identifier, associated with a network device, based on receiving the selection of the accounts application,
the user device connecting to the network via the network device;
determine that the network device is associated with a second account based on the network identifier,
the second account being associated with a home service provider;
request login credentials associated with the second account based on determining that the network device is associated with the second account;
receive the login credentials associated with the second account from the user device;
generate an association among the first account, the second account, and the user device based on receiving the login credentials associated with the second account;
cause, based on the association, the user device to present information regarding accounts associated with the user device in a single user interface on the user device,
the accounts including at least the first account and the second account;
receive a selection of one of the accounts associated with the user device; and
cause the user device to display information for the selected one of the accounts.

9. The system of claim 8, where the one or more devices are further to:
store information associating the user device with the second account based on generating the association;
identify the association based on the stored information; and
cause the user device to present information regarding the second account based on identifying the association.

10. The system of claim 8,
where, when receiving the selection of the accounts application, the one or more devices are further to:
receive login credentials associated with the first account; and where, when generating the association among the first account, the second account, and the user device, the one or more devices are further to:
generate an association among the first account, the user device, the second account, and the login credentials associated with the first account.

11. The system of claim 8,
where, when receiving the login credentials associated with the second account, the one or more devices are further to:
receive one or more of a username associated with the second account or a password associated with the second account; and where, when generating the association among the first account, the second account, and the user device, the one or more devices are further to:
generate an association among the first account, the user device, the second account, and the one or more of the username associated with the second account or the password associated with the second account.

12. The system of claim 8, where the network device is associated with the home service provider that is associated with the second account.

13. The system of claim 8, where the one or more devices are further to:
store, based on the association, one or more of:
information associating login credentials associated with the first account with the second account, or
information associating the login credentials associated with the second account with the first account.

14. A non-transitory computer-readable medium storing instructions, the instructions comprising:
a plurality of instructions which, when executed by one or more processors, cause the one or more processors to:
receive, via a network, a selection of an accounts application from a user device associated with a first account,
the user device being configured to receive information for the first account via the accounts application, and the first account being associated with a mobile service provider;
determine a network identifier, associated with a network device, based on receiving the selection of the accounts application,
the user device connecting to the network via the network device;
determine that the network device is associated with a second account based on the network identifier,
the second account being associated with a home service provider;
request login credentials associated with the second account based on determining that the network device is associated with the second account;
receive the login credentials associated with the second account from the user device;
generate an association among the first account, the second account, and the user device based on receiving the login credentials associated with the second account;
cause, based on the association, the user device to present information regarding accounts associated with the user device, in a single user interface on the user device,
the accounts including at least the first account and the second account;
receive a selection of one of the accounts associated with the user device; and
cause the user device to display information for the selected one of the accounts.

15. The non-transitory computer-readable medium of claim 14, where the plurality of instructions further cause the one or more processors to:
store information associating the user device with the second account based on generating the association between the user device and the second account;
identify the association between the user device and the second account, based on the stored information; and
cause the user device to present information regarding the second account based on identifying the association between the user device and the second account.

16. The non-transitory computer-readable medium of claim 14,
where one or more instructions, of the plurality of instructions, to receive the selection of the accounts application, include:
one or more instructions to cause the one or more processors to receive login credentials associated with the first account; and
where one or more instructions, of the plurality of instructions, to generate the association among the first account, the second account, and the user device, include:
one or more instructions to cause the one or more processors to generate an association among the first account, the user device, the second account, and the login credentials associated with the first account.

17. The non-transitory computer-readable medium of claim 14,
where one or more instructions, of the plurality of instructions, to receive the login credentials associated with the second account, include:
one or more instructions to cause the one or more processors to receive one or more of a username associated with the second account or a password associated with the second account; and
where one or more instructions, of the plurality of instructions, to generate the association among the first account, the second account, and the user device, include:
one or more instructions to cause the one or more processors to generate an association among the first account, the user device, the second account, and the one or more of the username associated with the second account or the password associated with the second account.

18. The non-transitory computer readable-medium of claim 14, where the plurality of instructions further cause the one or more processors to:
store, based on the association, information associating login credentials associated with the first account with the second account.

19. The non-transitory computer readable-medium of claim 14, where the network device is associated with the home service provider.

20. The non-transitory computer readable-medium of claim 14, where the home service provider is a provider of a television service.

* * * * *